(12) United States Patent
Honjo (10) Patent No.: US 12,307,068 B2
(45) Date of Patent: May 20, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Shuntaro Honjo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 623 days.

(21) Appl. No.: 17/528,161

(22) Filed: Nov. 16, 2021

(65) Prior Publication Data

US 2022/0382437 A1 Dec. 1, 2022

(30) Foreign Application Priority Data

Jun. 1, 2021 (JP) ................................. 2021-092494

(51) Int. Cl.
 G06F 3/048 (2013.01)
 G06F 3/04817 (2022.01)
 (Continued)

(52) U.S. Cl.
 CPC ...... *G06F 3/04817* (2013.01); *G06F 3/04847* (2013.01); *H04N 1/00413* (2013.01);
 (Continued)

(58) Field of Classification Search
 CPC ............ G06F 3/04817; G06F 3/04847; H04N 1/00413; H04N 1/00474; H04N 1/00506; H04N 1/00517
 See application file for complete search history.

(56) References Cited

U.S. PATENT DOCUMENTS 5,867,160 A * 2/1999 Kraft, IV ................ G06F 9/542
 718/103
5,892,511 A * 4/1999 Gelsinger ............. G06F 3/0481
 715/803
(Continued)

FOREIGN PATENT DOCUMENTS

JP 2019109750 7/2019
JP 2019121245 7/2019

*Primary Examiner* — Nicholas Augustine
(74) *Attorney, Agent, or Firm* — JCIPRNET (57) ABSTRACT

An information processing apparatus includes a processor configured to enable execution of plural kinds of application software provided from plural external cooperation services, enable execution of function display where function instruction icons for instructing which function is executed, among functions executable in cooperation with the application software of the external cooperation services are mostly displayed on a selection screen and service display where plural service instruction icons for instructing which external cooperation service is executed, among the plural external cooperation services are mostly displayed on the selection screen, and switch a display format to be executed between a first display format in which the function display is executed and the service instruction icons of the external cooperation services capable of executing a function of the selected function instruction icon in cooperation are displayed and a second display format in which the service display is executed and the function instruction icons of functions executable by the external cooperation service of the selected service instruction icon in cooperation are displayed, depending on a condition.

18 Claims, 7 Drawing Sheets

(51) Int. Cl.
  *G06F 3/04847* (2022.01)
  *H04N 1/00* (2006.01)
(52) U.S. Cl.
  CPC ..... *H04N 1/00474* (2013.01); *H04N 1/00506* (2013.01); *H04N 1/00517* (2013.01)

(56) References Cited

U.S. PATENT DOCUMENTS

| | | | | |
|---|---|---|---|---|
| 6,411,988 B1* | 6/2002 | Tafoya | H04L 12/1813 | 709/248 |
| 6,539,421 B1* | 3/2003 | Appelman | H04L 51/04 | 709/206 |
| 7,010,752 B2* | 3/2006 | Ly | G06Q 10/10 | 715/752 |
| 7,047,279 B1* | 5/2006 | Beams | G06Q 10/10 | 709/248 |
| 7,124,164 B1* | 10/2006 | Chemtob | H04L 12/1822 | 709/204 |
| 7,124,372 B2* | 10/2006 | Brin | H04L 12/1822 | 715/757 |
| 7,280,991 B1* | 10/2007 | Beams | G09B 7/04 | 706/46 |
| 7,353,252 B1* | 4/2008 | Yang | G06Q 10/10 | 709/204 |
| 7,370,269 B1* | 5/2008 | Prabhu | G06F 16/954 | 715/201 |
| 7,386,535 B1* | 6/2008 | Kalucha | G06Q 10/06 | |
| 7,590,941 B2* | 9/2009 | Wee | H04N 7/15 | 715/755 |
| 7,676,542 B2* | 3/2010 | Moser | G06Q 10/107 | 709/204 |
| 9,473,532 B2* | 10/2016 | Pearl | G06F 21/554 | |
| 9,652,741 B2* | 5/2017 | Goldberg | G06F 16/178 | |
| 10,860,172 B2 | 12/2020 | Kamasuka | | |
| 11,093,104 B2 | 8/2021 | Kamasuka | | |
| 2002/0002562 A1* | 1/2002 | Moran | G06F 16/40 | 707/E17.009 |
| 2002/0163548 A1* | 11/2002 | Chiu | G11B 27/28 | 715/864 |
| 2003/0023686 A1* | 1/2003 | Beams | G09B 5/14 | 709/205 |
| 2004/0117358 A1* | 6/2004 | von Kaenel | G06Q 40/08 | |
| 2004/0169683 A1* | 9/2004 | Chiu | G11B 27/105 | 715/776 |
| 2004/0201602 A1* | 10/2004 | Mody | G05B 19/409 | 715/700 |
| 2005/0234943 A1* | 10/2005 | Clarke | H04L 67/131 | |
| 2005/0257160 A1* | 11/2005 | DeBellis | G06F 3/0481 | 715/754 |
| 2006/0005163 A1* | 1/2006 | Huesken | G06F 9/465 | 717/107 |
| 2006/0025932 A1* | 2/2006 | Dadala | G01N 30/8675 | 702/19 |
| 2006/0026502 A1* | 2/2006 | Dutta | G06F 40/166 | 715/201 |
| 2006/0041752 A1* | 2/2006 | Tuvell | H04L 12/1822 | 713/171 |
| 2006/0053380 A1* | 3/2006 | Spataro | G06Q 10/10 | 709/204 |
| 2006/0101071 A1* | 5/2006 | Henderson | H04L 51/08 | |
| 2006/0117247 A1* | 6/2006 | Fite | G06Q 10/10 | 715/230 |
| 2006/0159109 A1* | 7/2006 | Lamkin | H04L 67/10 | 707/E17.032 |
| 2006/0168550 A1* | 7/2006 | Muller | G06Q 10/06 | 707/999.102 |
| 2006/0190391 A1* | 8/2006 | Cullen, III | G06Q 10/10 | 705/37 |
| 2006/0206370 A1* | 9/2006 | Skopal | G06Q 10/06 | 718/102 |
| 2006/0253542 A1* | 11/2006 | McCausland | H04L 51/04 | 709/207 |
| 2007/0033191 A1* | 2/2007 | Hornkvist | G06F 16/14 | 707/999.009 |
| 2007/0078930 A1* | 4/2007 | Ludwig | H04L 12/1818 | 709/204 |
| 2007/0100712 A1* | 5/2007 | Kilpatrick | G06Q 10/06 | 705/29 |
| 2007/0118598 A1* | 5/2007 | Bedi | G06Q 10/107 | 709/204 |
| 2007/0191979 A1* | 8/2007 | Zeng | G06Q 10/02 | 700/97 |
| 2008/0098295 A1* | 4/2008 | Nelson | H04L 65/1104 | 715/233 |
| 2008/0120126 A1* | 5/2008 | Bone | G06Q 10/10 | 706/45 |
| 2008/0229211 A1* | 9/2008 | Herberger | H04L 63/10 | 715/744 |
| 2008/0263629 A1* | 10/2008 | Anderson | H04L 9/3213 | 726/2 |
| 2009/0089625 A1* | 4/2009 | Kannappan | G06Q 10/10 | 714/39 |
| 2009/0138808 A1* | 5/2009 | Moromisato | G06Q 10/10 | 715/758 |
| 2010/0070970 A1* | 3/2010 | Hu | G06F 9/45533 | 718/1 |
| 2010/0138756 A1* | 6/2010 | Saund | H04L 51/216 | 715/758 |
| 2010/0180213 A1* | 7/2010 | Karageorgos | G06F 16/93 | 715/764 |
| 2010/0205537 A1* | 8/2010 | Knighton | H04L 12/1831 | 715/751 |
| 2010/0229085 A1* | 9/2010 | Nelson | G06F 40/186 | 715/255 |
| 2010/0235750 A1* | 9/2010 | Noland | H04L 41/22 | 709/221 |
| 2010/0241972 A1* | 9/2010 | Spataro | G06F 16/93 | 715/753 |
| 2010/0332980 A1* | 12/2010 | Sun | G06F 3/04815 | 715/706 |
| 2011/0167353 A1* | 7/2011 | Grosz | G06F 15/16 | 715/738 |
| 2011/0239129 A1* | 9/2011 | Kummerfeld | G06F 3/0488 | 715/750 |
| 2011/0239135 A1* | 9/2011 | Spataro | G06Q 10/10 | 715/753 |
| 2012/0089610 A1* | 4/2012 | Agrawal | G06F 16/20 | 707/741 |
| 2012/0233205 A1* | 9/2012 | McDermott | G06F 16/93 | 715/255 |
| 2012/0240061 A1* | 9/2012 | Hillenius | G06Q 10/06398 | 715/753 |
| 2012/0260195 A1* | 10/2012 | Hon | G06F 16/954 | 715/753 |
| 2012/0296790 A1* | 11/2012 | Robb | G06Q 40/04 | 715/741 |
| 2012/0331394 A1* | 12/2012 | Trombley-Shapiro | H04L 67/06 | 715/748 |
| 2013/0019150 A1* | 1/2013 | Zarom | H04N 21/4312 | 715/204 |
| 2013/0080919 A1* | 3/2013 | Kiang | H04L 67/63 | 715/753 |
| 2014/0082071 A1* | 3/2014 | Rexer | G06F 16/192 | 709/204 |
| 2015/0310188 A1* | 10/2015 | Ford | H04L 63/101 | 726/28 |
| 2018/0203577 A1* | 7/2018 | Astavans | H04N 7/152 | |
| 2019/0212899 A1* | 7/2019 | Kamasuka | G06F 3/04817 | |
| 2019/0385257 A1* | 12/2019 | Harris | G06Q 50/182 | |
| 2021/0149899 A1* | 5/2021 | Gutiérrez | G06F 16/252 | |
| 2021/0248311 A1* | 8/2021 | Helft | G06Q 10/1093 | |
| 2022/0043836 A1* | 2/2022 | Upadhyay | G06N 20/00 | |
| 2022/0284029 A1* | 9/2022 | Lal | G06F 16/14 | |
| 2022/0353331 A1* | 11/2022 | Lal | G06F 16/93 | |

* cited by examiner

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2021-092494 filed Jun. 1, 2021.

BACKGROUND

(i) Technical Field

The present invention relates to an information processing apparatus, a non-transitory computer readable medium storing an information processing program, and an information processing method.

(ii) Related Art

JP2019-121245A discloses an image forming apparatus on which an extension function program is loadable. The image forming apparatus includes a display unit that displays a plurality of display items for instructing function execution in the image forming apparatus, a setting unit that sets whether or not to group and display the plurality of display items by predetermined function of the image forming apparatus, and a display control unit that displays at least one display item, which corresponds to the predetermined function of the image forming apparatus and is formed by grouping the plurality of display items, based on the setting in the setting unit.

SUMMARY

Here, in the image forming apparatus, a case where many Web services for business (external cooperation services) are provided and documents stored in the services are printed, or the like is assumed.

Many icons including a function instruction icon for instructing which function is executed and a service instruction icon for instructing which external cooperation service is executed, need to be displayed on a selection screen. However, since a space where the icons can be displayed is limited, there is a need to switch display contents.

Aspects of non-limiting embodiments of the present disclosure relate to an information processing apparatus, a non-transitory computer readable medium storing an information processing program, and an information processing method capable of switching an icon to be first displayed between a function instruction icon and a service instruction icon depending on a condition.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to enable execution of a plurality of kinds of application software provided from a plurality of external cooperation services, enable execution of function display where function instruction icons for instructing which function is executed, among functions executable in cooperation with the application software of the external cooperation services are mostly displayed on a selection screen and service display where a plurality of service instruction icons for instructing which external cooperation service is executed, among the plurality of external cooperation services are mostly displayed on the selection screen, and switch a display format to be executed between a first display format in which the function display is executed and the service instruction icons of the external cooperation services capable of executing a function of the selected function instruction icon in cooperation are displayed and a second display format in which the service display is executed and the function instruction icons of functions executable by the external cooperation service of the selected service instruction icon in cooperation are displayed, depending on a condition.

Here, "switch depending on a condition" specifically includes both of switching by a program or the like based on a predetermined numerical value or the like and manual switching under a condition of user's selection based on user's determination or preference.

BRIEF DESCRIPTION OF THE DRAWINGS

Exemplary embodiment(s) of the present invention will be described in detail based on the following figures, wherein.

DETAILED DESCRIPTION

First Exemplary Embodiment

Hereinafter, an information processing system 10 according to a first exemplary embodiment will be described.

Figure 1:
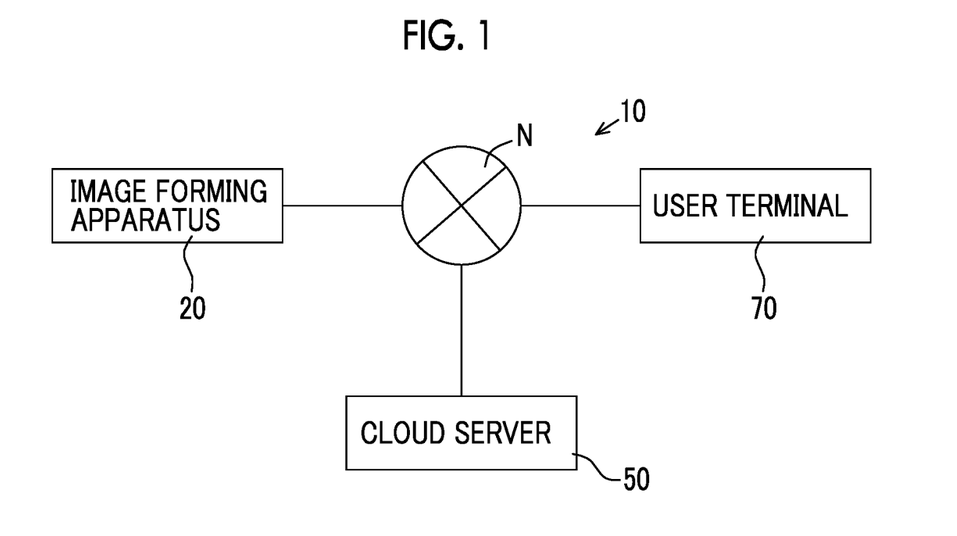
FIG. 1 is a diagram showing the configuration of an information processing system.

FIG. 1 is a diagram showing the configuration of the information processing system 10.

As shown in FIG. 1, the information processing system 10 includes an image forming apparatus 20, a cloud server 50, and a user terminal 70. The image forming apparatus 20, the cloud server 50, and the user terminal 70 are connected via a network N and can perform communication with each other. As the network N, as an example, the Internet, a local area network (LAN), or a wide area network (WAN) is applied. The image forming apparatus 20 is an example of an "information processing apparatus", and the user terminal 70 is a terminal apparatus that is usable by a user who can access the "image forming apparatus 20" via the Internet, a LAN, or the like.

In the information processing system 10, a case where many cloud services as a WEB service for business (external cooperation service) are provided and documents or the like stored in the services are printed in the image forming apparatus 20 is assumed. In such a case, many icons including a function instruction icon for instructing which function is executed and a service instruction icon for instructing which external cooperation service is executed, need to be displayed on a selection screen of the image forming apparatus 20. However, since a space where the icons can be displayed is limited, there is a need to switch display contents. The information processing system 10 according to the exemplary embodiment is a system that can switch an icon to be first displayed between the function instruction icon and the service instruction icon, depending on a condition.

The cloud server 50 is a server computer that provides a cloud service as an external cooperation service in the information processing system 10. The cloud service is an example of a "specific service".

The cloud service includes various cloud services, for example, a WEB database type business application construction cloud service. The cloud service includes cloud services that are accessible anytime and anywhere in a case where the cloud services can be viewed in a WEB browser and in a case where a device connected to the Internet is provided, and specifically, include cloud services capable of coping with various kinds of business, such as customer management and transportation expense application.

Figure 2:
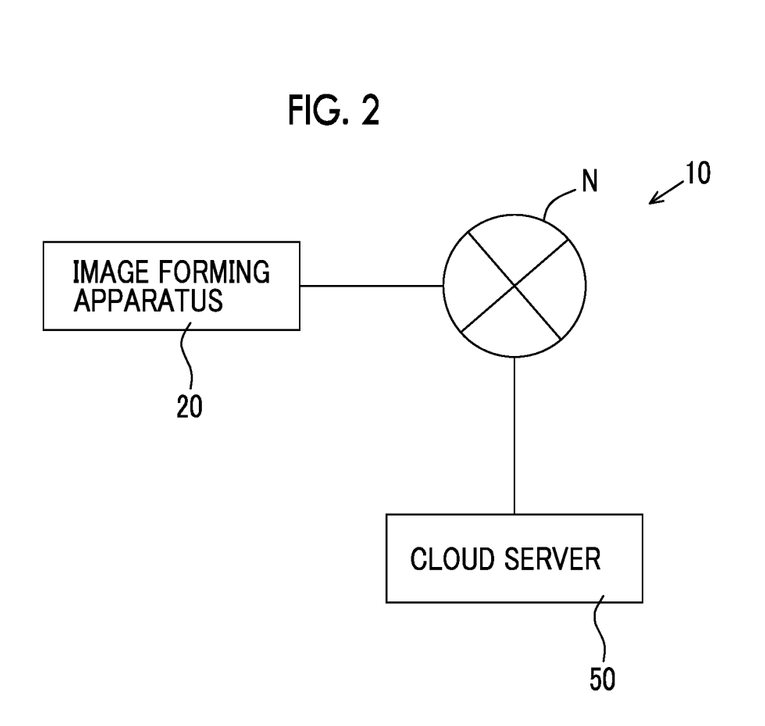
FIG. 2 is a diagram showing the configuration of the information processing system in a case where there is no user terminal.

Although the information processing system 10 shown in FIG. 1 described above has a configuration in which the image forming apparatus 20 and the user terminal 70 are connected via the Internet, the intranet, or the like, the present disclosure is not necessarily limited to this form. Specifically, for example, as shown in FIG. 2, the user terminal 70 shown in FIG. 1 may not be included. In such a case, various kinds of input processing and the like are executed through a display unit 37, an operation unit 38, and the like described below of the image forming apparatus 20.

Figure 3:
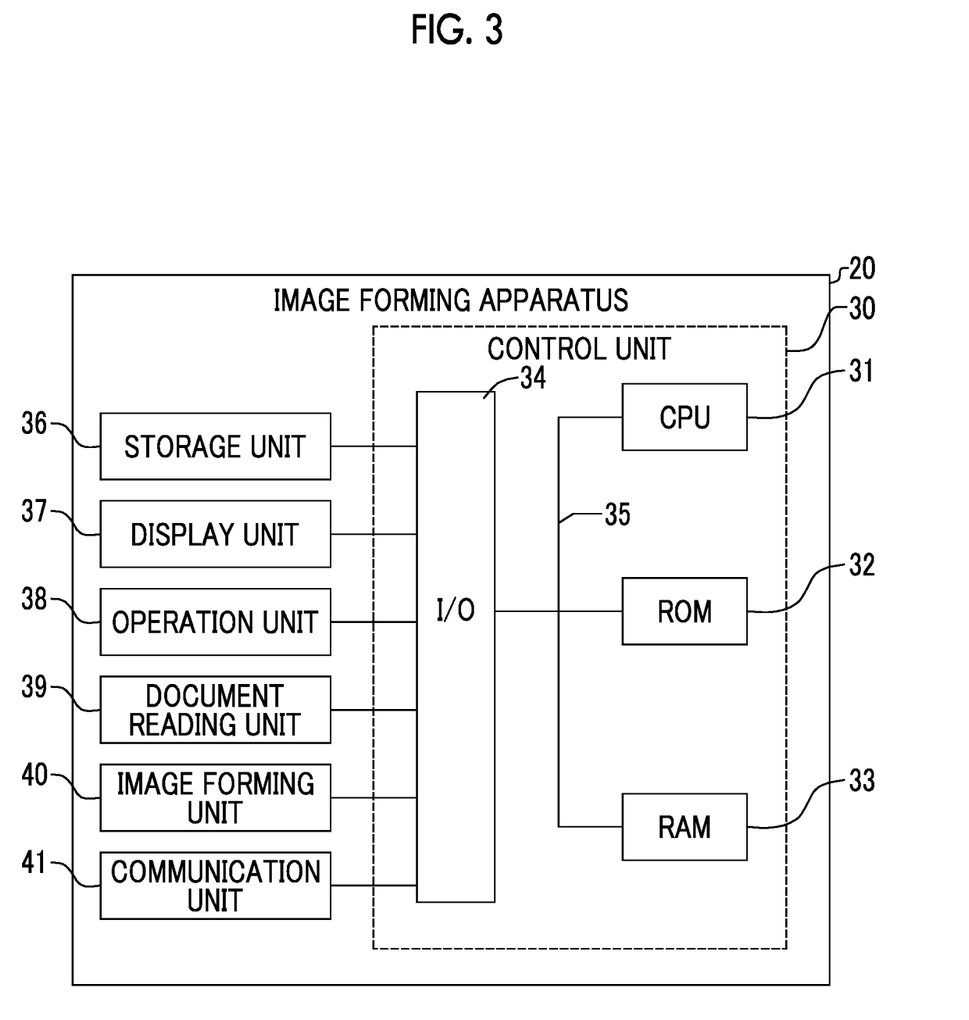
FIG. 3 is a block diagram showing the hardware configuration of an image forming apparatus.

FIG. 3 is a block diagram showing the hardware configuration of the image forming apparatus 20.

As shown in FIG. 3, the image forming apparatus 20 includes a control unit 30 that controls the operation of the image forming apparatus 20. The control unit 30 has a configuration in which a central processing unit (CPU) 31, a read only memory (ROM) 32, a random access memory (RAM) 33, and an input/output interface (I/O) 34 are connected via a bus 35 to perform communication with each other. The CPU 31 is an example of a "processor".

The CPU 31 is a central arithmetic processing unit and executes various programs or controls each unit. That is, the CPU 31 reads programs from the ROM 32 or a storage unit 36 described below and executes the programs with the RAM 33 as a work area. The CPU 31 controls each configuration and executes various kinds of arithmetic processing in association with the programs stored in the ROM 32 or the storage unit 36.

An information processing program may be installed on the image forming apparatus 20 in advance or may be stored in a nonvolatile storage medium or may be distributed via the network N and installed on the image forming apparatus 20. Examples of the nonvolatile storage medium include a CD-ROM, a magneto-optical disk, a hard disk drive (HDD), a DVD-ROM, a flash memory, and a memory card.

The ROM 32 stores various programs and various kinds of data. The RAM 33 temporarily stores the programs or data as a work area.

The storage unit 36, the display unit 37, the operation unit 38, a document reading unit 39, an image forming unit 40, and a communication unit 41 are connected to the I/O 34. Such units can perform communication with the CPU 31 via the I/O 34.

The storage unit 36 is configured of a storage device, such as an HDD, a solid state drive (SSD), or a flash memory, and stores various programs and various kinds of data.

As the display unit 37, for example, a liquid crystal display (LCD) or an organic electro luminescence (EL) display is used.

As the operation unit 38, though not particularly shown, various operation keys, such as a numeric keypad, a start key, a cursor movement switch for moving a cursor (outlined arrow) on a selection screen 42, and an OK switch for confirming an icon selected by moving the cursor, are provided.

The display unit 37 and the operation unit 38 receive various instructions from a user of the image forming apparatus 20. Various instructions include, for example, an instruction to start reading of a document, such as customer management data and an instruction to start copying of a document. The display unit 37 displays various kinds of information, such as a result of processing executed in response to an instruction received from the user and notification on processing.

The document reading unit 39 fetches a document placed on a paper feeding table of an automatic document feeder (not shown) provided in an upper portion of the image forming apparatus 20 one by one and optically reads the fetched document to obtain image information. Alternatively, the document reading unit 39 optically reads a document placed on a document table, such as platen glass, to obtain image information.

The image forming unit 40 forms, on a recording medium, such as paper, an image based on the image information obtained through reading by the document reading unit 39 or image information obtained from an external personal computer (PC) connected via the network N.

The communication unit 41 is an interface for communication with other equipment, such as a PC of the user terminal 70. For the communication, for example, a wired communication standard, such as Ethernet (Registered Trademark) or FDDI, or a wireless communication standard, such as 4G, 5G, or Wi-Fi (Registered Trademark), is used.

In executing the above-described information processing program, the image forming apparatus 20 executes processing based on the information processing program using the above-described hardware resources.

Figure 4:
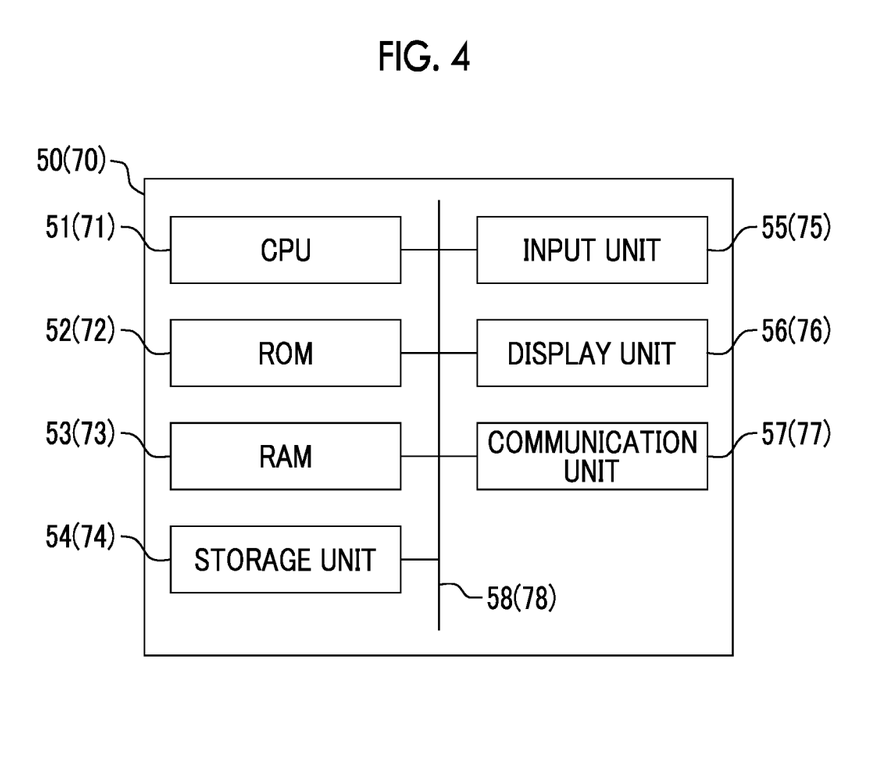
FIG. 4 is a block diagram showing the hardware configuration of a cloud server and a user terminal.

FIG. 4 is a block diagram showing the hardware configuration of the cloud server 50 and the user terminal 70. For the cloud server 50 and the user terminal 70, as an example, a general-purpose computer apparatus, such as a server computer or a PC, or a portable terminal, such as a smartphone or a tablet terminal, is applied.

In the first exemplary embodiment, the cloud server 50 is a "server computer", and the user terminal 70 is a "PC". The cloud server 50 and the user terminal 70 basically have a general computer configuration, and thus, the cloud server 50 will be described representatively.

As shown in FIG. 4, the cloud server 50 includes a CPU 51, a ROM 52, a RAM 53, a storage unit 54, an input unit 55, a display unit 56, and a communication unit 57. The respective configurations are connected via a bus 58 to perform communication with each other.

The CPU 51 is a central arithmetic processing unit and executes various programs or controls each unit. That is, the CPU 51 reads programs from the ROM 52 or the storage unit 54 and executes the programs with the RAM 53 as a work area. The CPU 51 controls each configuration and executes various kinds of arithmetic processing in association with the programs stored in the ROM 52 or the storage unit 54.

The ROM 52 stores various programs and various kinds of data. The RAM 53 temporarily stores the programs or data as a work area.

The storage unit 54 is configured of a storage device, such as an HDD, an SSD, or a flash memory, and stores various programs including an operating system and various kinds of data.

The input unit 55 includes a pointing device, such as a mouse, various buttons, a keyboard, a microphone, and a camera as an example and is used to perform various inputs.

The display unit 56 is a liquid crystal display as an example and displays various kinds of information. The display unit 56 may employ a touch panel system to function as the input unit 55.

The communication unit 57 is an interface for communication with other equipment. For the communication, for example, a wired communication standard, such as Ethernet (Registered Trademark) or FDDI, or a wireless communication standard, such as 4G, 5G, or Wi-Fi (Registered Trademark), is used.

The image forming apparatus 20 as an information processing apparatus according to the exemplary embodiment includes the CPU 31 as an example of the processor. Then, the CPU 31 can execute a plurality of kinds of application software provided from a plurality of external cooperation services.

The CPU 31 can execute function display where function instruction icons for instructing which function is executed, among functions executable in cooperation with the application software of the external cooperation service are mostly displayed on the selection screen 42.

The CPU 31 can execute service display where a plurality of service instruction icons for instructing which external cooperation service is executed, among a plurality of external cooperation services are mostly displayed on the selection screen 42.

Next, a first display format described below will be described referring to FIG. 5, and a second display format described below will be described referring to FIG. 6.

Figure 5:
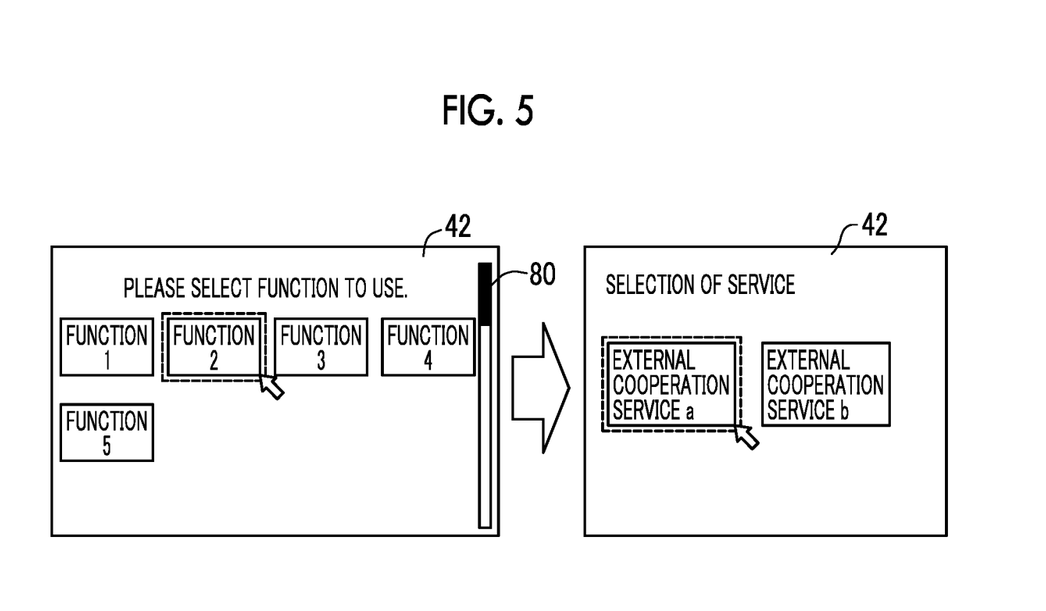
FIG. 5 is a display example of a display unit of the image forming apparatus showing a first display format.
Figure 6:
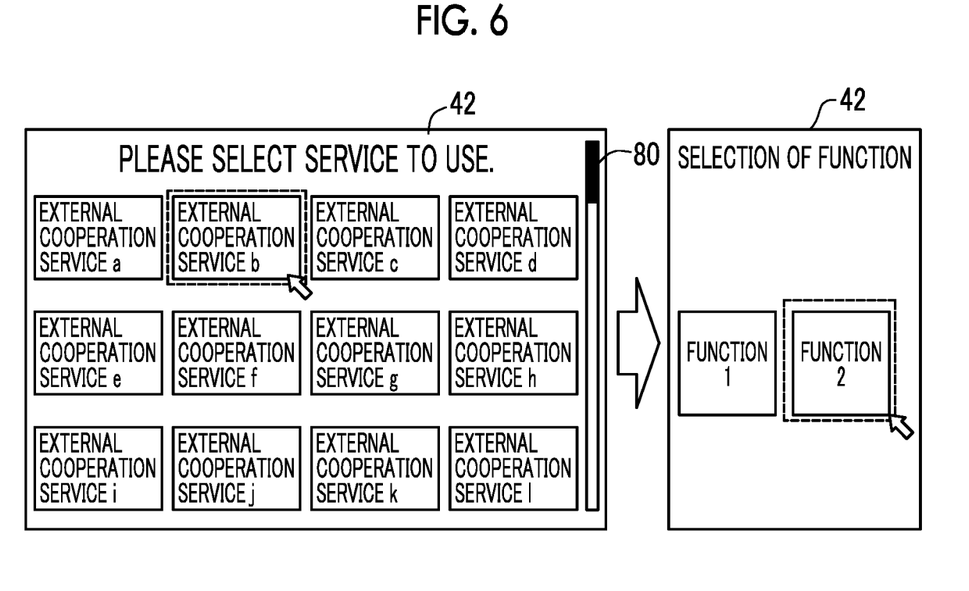
FIG. 6 is a display example of the display unit of the image forming apparatus showing a second display format.

FIG. 5 is a display example of the selection screen 42 of the display unit 37 of the image forming apparatus 20 showing the first display format, and FIG. 6 is a display example of the selection screen 42 of the display unit 37 of the image forming apparatus 20 showing the second display format.

As shown on a left side of FIG. 5, in the first display format, the function display is executed, and service instruction icons (specifically, for example, external cooperation service a and external cooperation service b on a right side of FIG. 5) of external cooperation services executable a function (specifically, for example, a function 2 indicated by an outlined arrow on the left side of FIG. 5) of a selected function instruction icon in cooperation are mostly displayed on the selection screen 42. Then, in a case where an external cooperation service that the user requests is the external cooperation service a, the user operates a switch (for example, the cursor movement switch) of the operation unit 38 of the image forming apparatus 20, then, moves the cursor (outlined arrow) to the external cooperation service a on the right side of FIG. 5, and operates the OK switch (not shown) of the operation unit 38. In this way, the external cooperation service a is selected.

In a case where the number of icons increases and all icons are not displayed on one screen of the selection screen 42, a scroll bar 80 for scrolling the selection screen 42 up and down is formed at a right end of the selection screen 42.

As shown on a left side of FIG. 6, in the second display format, the service display is executed, and function instruction icons (specifically, for example, a function 1 and a function 2 on a right side of FIG. 6) of functions executable by an external cooperation service (specifically, for example, an external cooperation service b indicated by an outlined arrow on the left side of FIG. 6) of a selected service instruction icon in cooperation are displayed. Then, in a case where a function that the user requests is the function 2, the user operates a switch (for example, the cursor movement switch) of the operation unit 38 of the image forming apparatus 20, moves the cursor (outlined arrow) to the function 2 on the right side of FIG. 6, and operates the OK switch (not shown) of the operation unit 38. In this way, the function 2 is selected.

The CPU 31 according to the exemplary embodiment switches a display format to be executed between the first display format and the second display format described above depending on a "condition".

Here, in the exemplary embodiment, switching depending on a "condition" refers to that the CPU 31 switches the display format to be executed between the first display format and the second display format depending on the number of external cooperation services.

Specifically, in the exemplary embodiment, the CPU 31 first executes the second display format, and in a case where the number of external cooperation services in cooperation exceeds a predetermined first threshold value, executes the first display format.

The above-described "first threshold value" specifically means the number of functions that are provided in the image forming apparatus 20 and executable in cooperation with the application software of the external cooperation services. That is, in a case where the number of external cooperation services in cooperation exceeds the number of such functions, the display format is switched to the first display format.

Specifically, for example, in a case where the functions that are provided in the image forming apparatus and executable in cooperation with the application software of the external cooperation services are three of "copy", "FAX", and "scan", the first threshold value is "3". In a case where the number of external cooperation services in cooperation exceeds the first threshold value "3" that is the number of functions, the display format is switched from the second display format to the first display format.

Of course, the "first threshold value" is not limited to the above-described numerical value, and may be set to a numerical value increased or decreased by a predetermined number more or less than the number of functions, may be set to a predetermined numerical value, or may be set to any numerical value that the user requests.

In a case where the number of icons increases, all icons cannot be displayed on one screen of the selection screen 42, and the user can scroll the screen up and down and can recognize all icons by manually operating the scroll bar 80 at the right end of the selection screen 42. However, the scroll operation takes a lot of labor for the user, and the operation is complicated. Since all icons cannot be viewed at one time, visibility is deteriorated, and the operation needs a lot of time.

On the other hand, as the size of the icon is smaller, more icons can be displayed on the selection screen having a limited area. However, the size of the icon is restricted in consideration of visibility of many users that include all people including old people.

For this reason, the number of icons that are displayed on one selection screen simultaneously is limited.

In a case where the number of icons increases, there is a need to switch the selection screen or move a range of icons to be displayed by scroll or the like. For this reason, a lot of labor is taken for searching for a requested icon using the selection screen, and operability is deteriorated.

Here, the functions mostly include copy, FAX, scan, and the like, and in regard to the number of functions, a general number of three to about five is used. In contrast, there is a possibility that the number of external cooperation services in cooperation increases up to a maximum of about 50.

For this reason, in a case where the number of external cooperation services is a lot greater than the number of functions, and as shown in FIG. 6, in a case where the second display format in which the service display is initially executed is the first, as shown in FIG. 6, for example, a requested icon should be searched from among service instruction icons of many external cooperation services of a maximum of about 50, a lot of labor is taken, the operation becomes complicated, and the efficiency of the operation is degraded. In this case, as shown in FIG. 5, all function instruction icons are displayed on the selection screen 42, and one requested function is selected from the number of such functions (from three to about five). In this way, it is possible to narrow down to service instruction icons of external cooperation services having a cooperation function selected from service instruction icons of about 50 external cooperation services and to considerably reduce the number of service instruction icons displayed on the selection screen 42, and it is easy to select a requested service instruction icon.

Accordingly, in a case where the number of service instruction icons is greater than the number of function instruction icons, the efficiency of operability of a selection operation of an icon is estimated to be increased in the first display format (FIG. 5) in which the function instruction icon is first displayed rather than in the second display format (FIG. 6) in which the service instruction icon is first displayed.

In this way, in a case where the number of service instruction icons in cooperation exceeds the first threshold value that is the number of functions executable in cooperation with the application software of the external cooperation services, the display format is switched to the first display format in which the function display is executed first, making it possible to display fewer icons on the selection screen 42 having a limited space.

An icon to be first displayed is switched between the function instruction icon and the service instruction icon in consideration of the number of icons displayed on one selection screen without switching a display range, such as scroll.

As a result, it is possible to switch an icon to be first displayed between the function instruction icon and the service instruction icon depending on the condition of the number of external cooperation services in cooperation.

Figure 7:
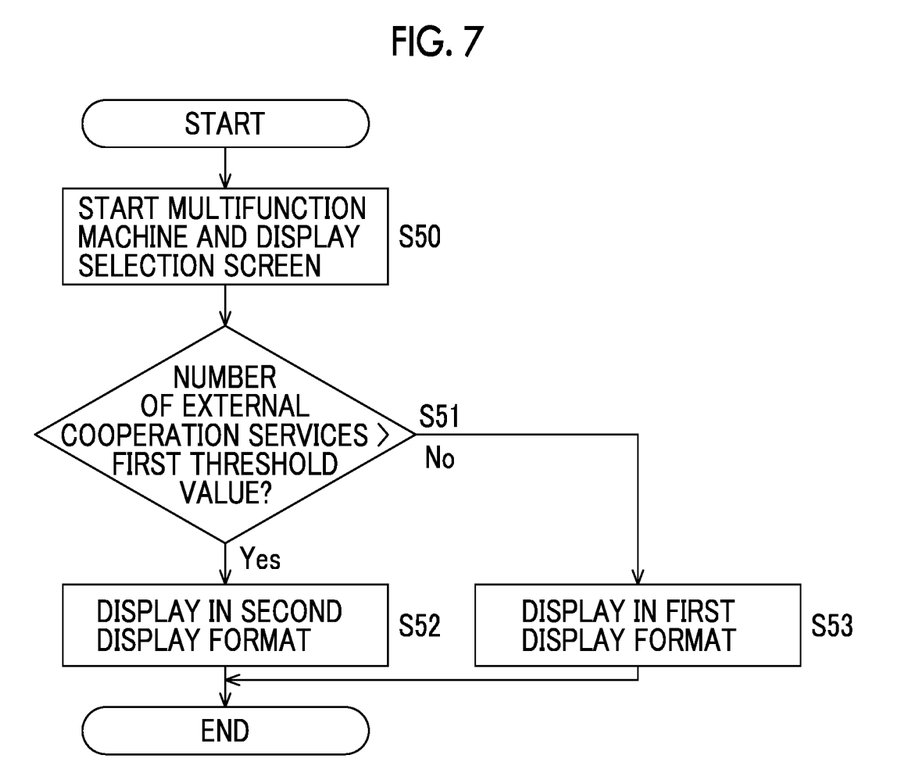
FIG. 7 is a flowchart illustrating a flow of processing of a first exemplary embodiment.

A flow of processing of the exemplary embodiment will be described referring to FIG. 7. FIG. 7 is a flowchart illustrating a flow of processing of the exemplary embodiment.

First, in Step S50, the CPU 31 starts the image forming apparatus 20 and displays the selection screen 42 on the display unit 37.

In Step S51, the CPU 31 progresses to Step S53 in a case where the number of external cooperation services in cooperation exceeds the first threshold value, and progresses to Step S52 in a case where the number of external cooperation services in cooperation is equal to or less than the first threshold value.

In Step S53, the CPU 31 executes display in the second display format. Then, the processing ends.

In Step S54, the CPU 31 executes display in the first display format. Then, the processing ends.

Here, although the CPU 31 selects the display format without user's selection or the like, the present disclosure is not particularly limited, the display may be executed through the user's selection after the display format is selected. In such a case, any of the two display formats can be selected by a touch panel of the selection screen 42, movement of a cursor, or the like.

A timing of executing the flowchart shown in FIG. 7 includes execution at a timing of starting the information processing apparatus or execution at a timing of initially starting the information processing apparatus. The execution timing is not limited thereto, and for example, the number of external cooperation services in cooperation may be checked and the flowchart may be executed in a case where the number fluctuates.

Here, there is a possibility that the number of external cooperation services in cooperation increases with appearance of a new external cooperation service, an external cooperation service with excellent performance or serviceability, and the like.

On the other hand, there is a possibility that the number of external cooperation services decreases depending on change in business contents accompanied with change in fashion or change in times, and the number of external cooperation services in cooperation increases or decreases incessantly and fluctuates.

Accordingly, in the exemplary embodiment, first, the second display format is executed, and in a case where the number of external cooperation services in cooperation exceeds the first threshold value with an increase in the number of external cooperation services in cooperation as described above, the first display format is executed.

However, the CPU 31 executes the first display format, and in a case where the number of external cooperation services in cooperation is equal to or less than the above-described first threshold value, executes the second display format. The display format is switched to the second display format in which the service display is first executed, and the second display format is executed.

With this, in a case where the number of external cooperation services decreases to be equal to or less than the first threshold value, it is possible to switch the display format.

As a result, it is possible to switch the display format and to cope with an increase or a decrease in the number of external cooperation services in cooperation.

According to the exemplary embodiment, in a case where the number of external cooperation services exceeds the first threshold value, the first display format is selected, whereby it is possible to avoid a situation in which there is no space of the selection screen 42 due to the service instruction icons.

According to the exemplary embodiment, in a case where the number of external cooperation services is equal to or less than the first threshold value, it is possible to switch the display format to the second display format.

According to the exemplary embodiment, it is possible to switch a display format to be executed between the first display format and the second display format depending on the number of external cooperation services.

With this, it is possible to switch an icon to be first displayed between the function instruction icon and the service instruction icon depending on a condition.

Second Exemplary Embodiment

Hereinafter, a second exemplary embodiment will be described while omitting or simplifying overlapping portions with other exemplary embodiments.

In an information processing apparatus (image forming apparatus 20) according to the exemplary embodiment, the CPU 31 initially executes the second display format as shown in FIG. 6, and in a case where the number of external cooperation services in cooperation exceeds a second threshold value, displays a guide about whether or not to switch the display format to the first display format.

Here, as in the first exemplary embodiment, specifically, the above-described "second threshold value" includes the number of functions that are provided in the image forming apparatus 20 and executable in cooperation with the application software of the external cooperation services. Of course, the second threshold value is not limited to the above-described numerical value, and may be set to a numerical value increased or decreased by a predetermined number more or less than the number of functions or may be set to a predetermined numerical value.

Figure 8:
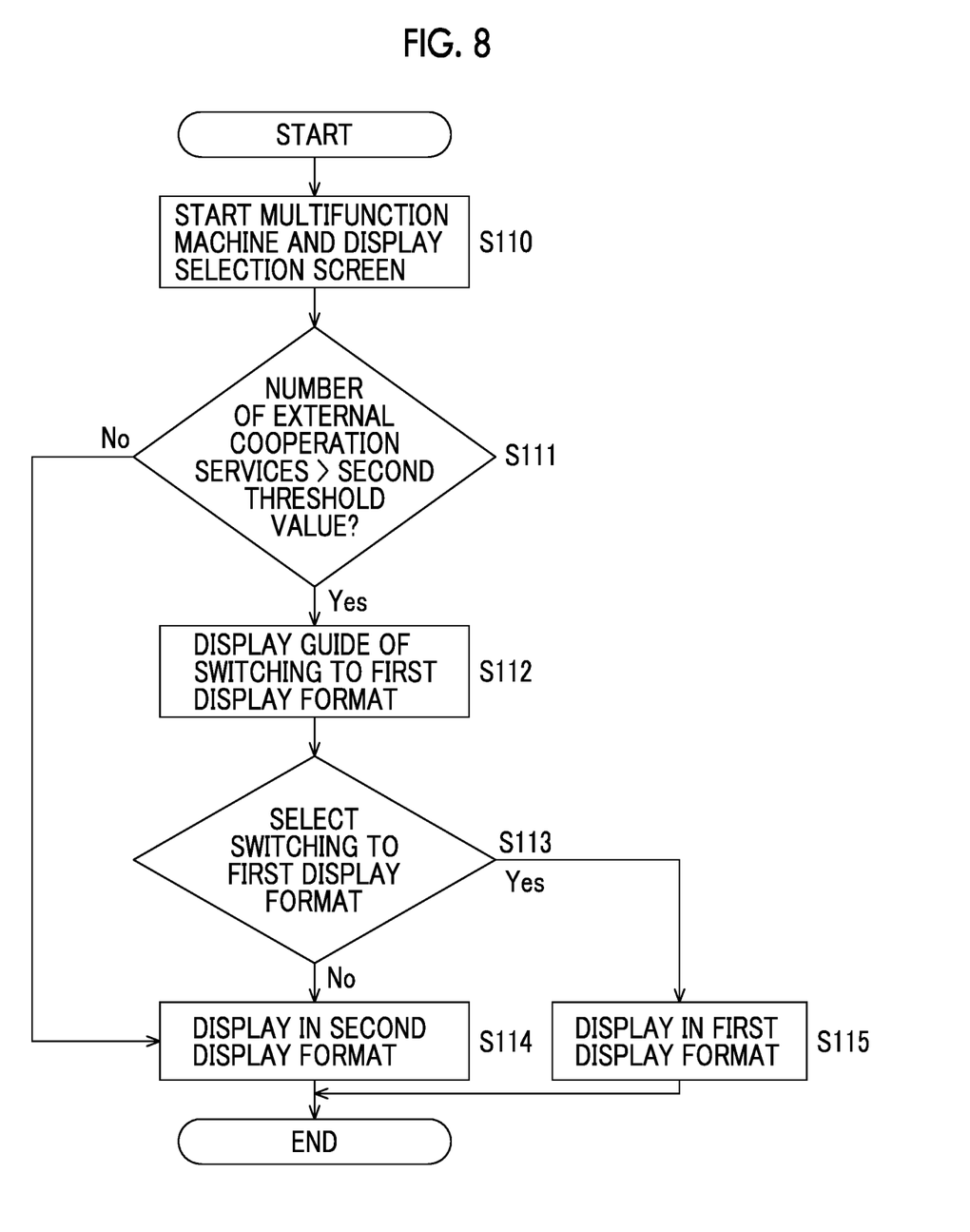
FIG. 8 is a flowchart illustrating a flow of processing of a second exemplary embodiment.

A flow of processing of the exemplary embodiment will be described referring to FIG. 8. FIG. 8 is a flowchart illustrating a flow of processing of the exemplary embodiment.

First, in Step S110, the CPU 31 starts the image forming apparatus 20 and displays the selection screen 42 on the display unit 37.

In Step S111, the CPU 31 progresses to Step S112 in a case where the number of external cooperation services in cooperation exceeds the second threshold value, and progresses to Step S114 in a case where the number of external cooperation services in cooperation is equal to or less than the second threshold value.

In Step S112, the CPU 31 displays a guide about whether or not to switch the display format to the first display format, on the display unit 56. Though not particularly shown, on the selection screen 42, any of two selection ranges of a range of "execute switching to the first display format" and a range of "not execute switching to the first display format" can be selected by the touch panel, movement of the cursor, or the like.

In Step S113, the CPU 31 determines whether or not the user selects to switch the display format to the first display format. In a case where determination is made that the user does not select to switch, the CPU 31 progresses to Step S114, and in a case where determination is made that the user selects to switch, the CPU 31 progresses to Step S115.

In Step S114, the CPU 31 executes display in the second display format. Then, the processing ends.

In Step S115, the CPU 31 executes display in the first display format. Then, the processing ends.

A timing of executing the flowchart shown in FIG. 8 includes execution at a timing of starting the information processing apparatus or execution at a timing of initially starting the information processing apparatus. The execution timing is not limited thereto, and for example, the number of external cooperation services in cooperation may be checked and the flowchart may be executed in a case where the number fluctuates.

According to the exemplary embodiment, in a case where the number of external cooperation services exceeds the second threshold value, the user is allowed to recognize the guide about whether or not to switch the display format to the first display format.

In the exemplary embodiment, though not particularly shown in a flow or the like, the CPU 31 may execute the first display format, and in a case where the number of external cooperation services in cooperation is equal to or less than the second threshold value, may display a guide about whether or not to switch the display format to the second display format.

With this, in a case where the number of external cooperation services is equal to or less than the second threshold value, the user is allowed to recognize the guide about whether or not to switch the display format to the second display format.

Third Exemplary Embodiment

A third exemplary embodiment will be described referring to FIGS. 9A and 9B.

In the exemplary embodiment, the CPU 31 receives setting of display and non-display of function instruction icons and service instruction icons on the selection screen 42.

Figure 9A:
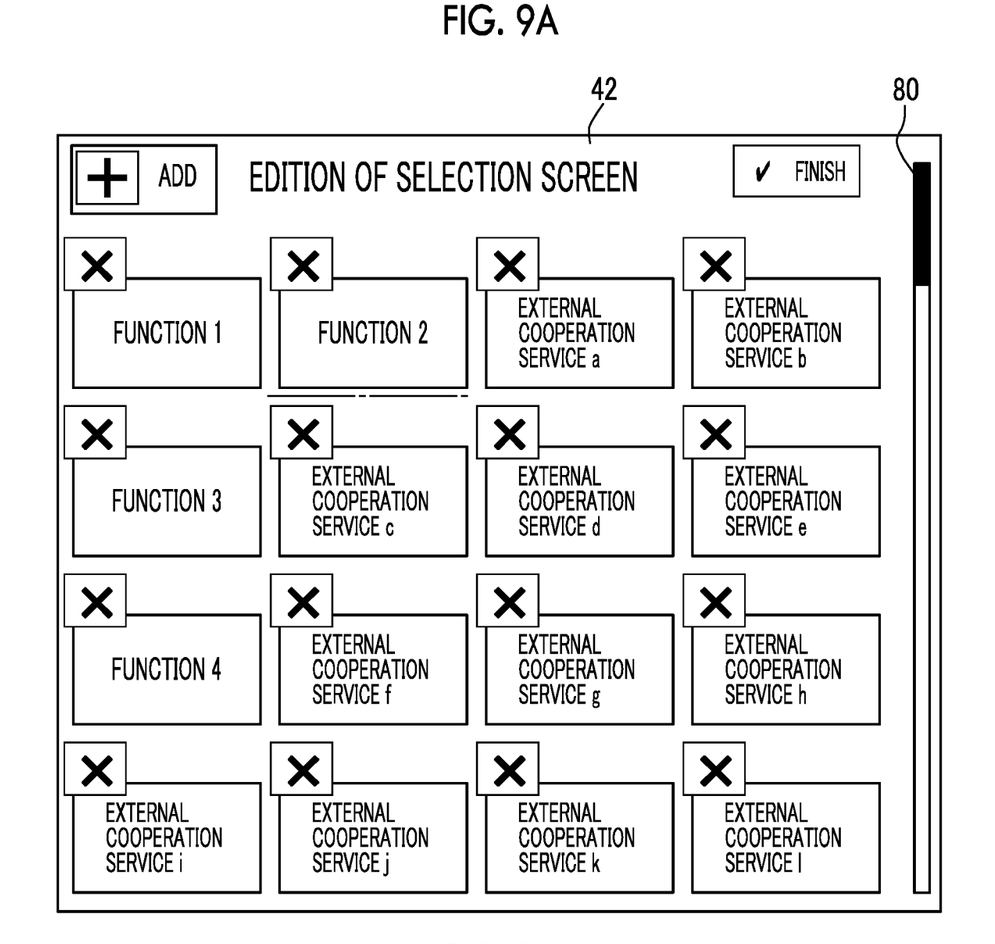
FIGS. 9A and 9B are display examples of a display unit of an image forming apparatus of a third exemplary embodiment.
Figure 9B:
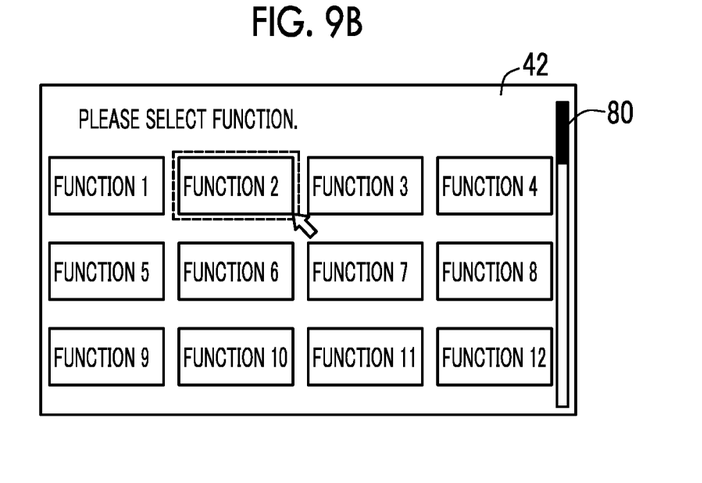

As shown in FIG. 9A, function instruction icons and service instruction icons are mixedly displayed on the selection screen 42. A x mark is displayed on an upper left side of each of the function instruction icons and the service instruction icons. In a case where the cursor movement switch (not shown) of the operation unit 38 is operated to move the cursor over the x mark and the OK switch (not shown) is operated, the function instruction icon or the service instruction icon is erased from the selection screen 42.

In a case where the cursor is moved over "+ADD" on an upper left side of FIG. 9A and the OK switch is operated, another screen of function instruction icons or service instruction icons addable to the selection screen 42 is displayed. Specifically, for example, in a case of adding a function instruction icon, another screen shown in FIG. 9B is displayed, the cursor movement switch (not shown) of the operation unit 38 is operated to move the cursor (outlined arrow) over a function instruction icon to add as described in FIG. 9B, and the OK switch of the operation unit 38 is operated. In this way, the function instruction icon selected by the cursor is added and displayed on the selection screen 42.

The cursor (outlined arrow) is moved over a "FINISH" button on an upper right side of FIG. 9A and the OK switch is operated. In this way, the selection screen 42 is confirmed with the contents of the icons in this state. In a case where the image forming apparatus 20 starts next, the selection screen 42 is displayed with the icons in this state.

According to the exemplary embodiment, it is possible to allow the user to decide setting of display and non-display of function instruction icons and service instruction icons on the selection screen 42.

Fourth Exemplary Embodiment

In the exemplary embodiment, the CPU 31 can display service instruction icons on the selection screen 42 on which the function display is executed, and can further bring the displayed icons into non-display.

In the exemplary embodiment, the CPU 31 can display function instruction icons on the selection screen 42 on which the service display is executed, and can further bring the displayed icons into non-display.

That is, in the exemplary embodiment, even though the function display is executed, it is possible to mixedly display service instruction icons on the selection screen 42 in addition to function instruction icons. In addition, it is possible to set display or non-display of service instruction icons, and to put in or out service instruction icons. Even though the service display is executed, it is possible to mixedly display function instruction icons, and to put in or out (set display or non-display) function instruction icons.

Figure 10:
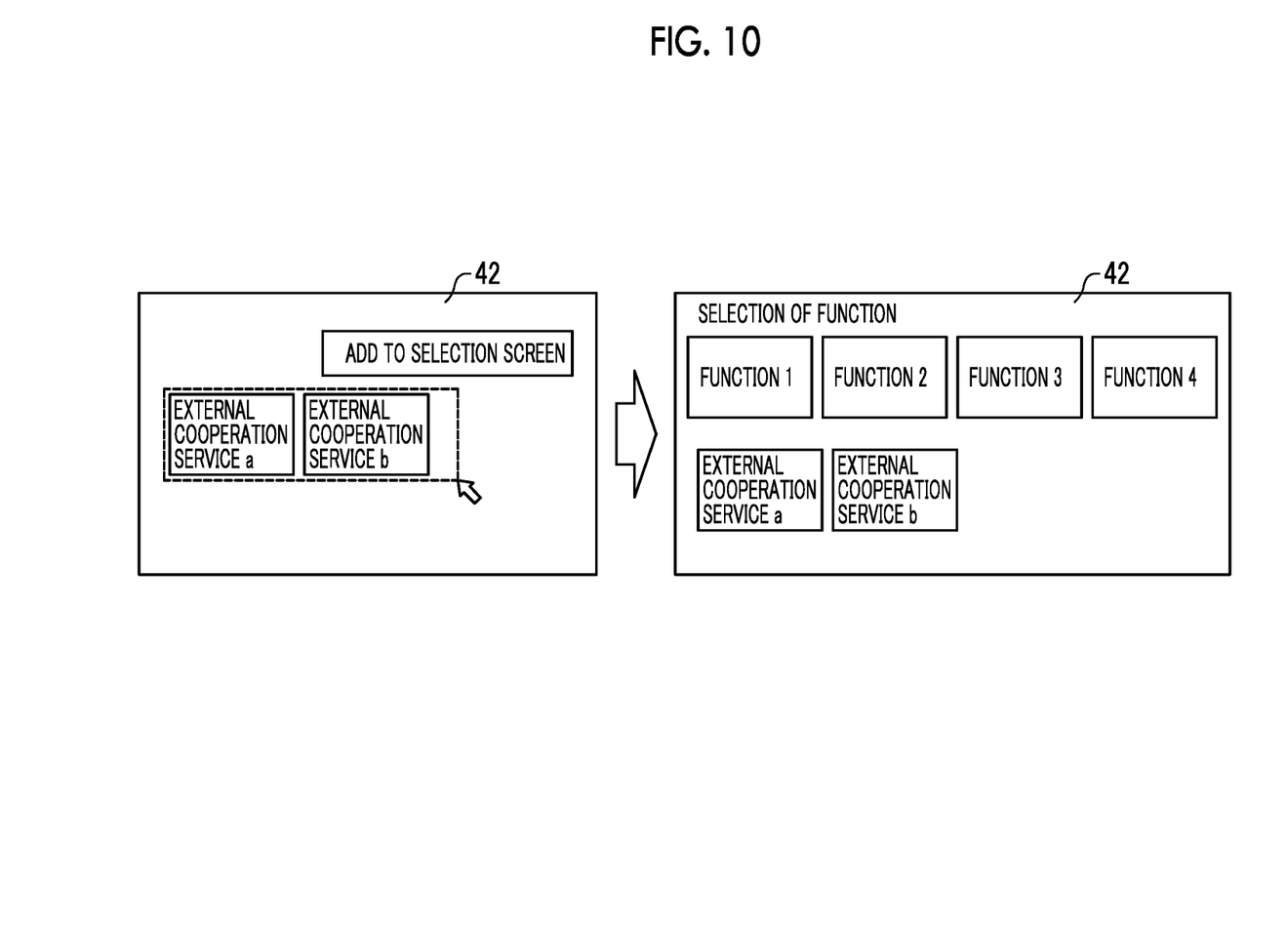
FIG. 10 is a display example of a display unit of an image forming apparatus of a fourth exemplary embodiment.

A specific method of setting display or non-display of an icon includes a method that can be executed by moving the cursor and operating the OK switch of the operation unit as described in the third exemplary embodiment. Of course, the method of setting display or non-display of an icon is not limited to the above-described method, and other means or methods may be used insofar as the user can select display or non-display of a requested icon. Specifically, the following method is included. For example, as shown in FIG. 10, in a case where an external cooperation service a and an external cooperation service b often used by the user are displayed on the selection screen 42 on a left side of FIG. 10, a range of a quadrangular dotted-line frame is designated on the selection screen 42 on the left side of FIG. 10 through drag-and-drop using the cursor of the outlined arrow. Thereafter, "ADD TO SELECTION SCREEN" on an upper right side of the selection screen 42 is selected. In this way, two service instruction icons included in the designated range can be moved and added to the selection screen 42 on a right side of FIG. 10 on which the function display is executed.

According to the exemplary embodiment, even on the selection screen 42 on which the function display is executed, it is possible to mixedly display service instruction icons, and to further bring icons into non-display, that is, to put in or out service instruction icons as the user requests.

Even on the selection screen 42 on which the service display is executed, it is possible to display function instruction icons, and to further bring icons non-display, that is, to put in or out function instruction icons.

As a result, it is possible to put in or out icons in the second display format from the selection screen 42 in the first display format as the user requests, and to put in or out icons in the first display format from the selection screen 42 in the second display format as the user requests.

Fifth Exemplary Embodiment

In the exemplary embodiment, the CPU 31 switches the display format to the first display format or the second display format in a case where the number of icons displayed on the selection screen 42 exceeds a third threshold value.

In the exemplary embodiment, the CPU 31 switches the display format to the first display format or the second display format in a case where the number of icons displayed on the selection screen 42 is equal to or less than the third threshold value.

The number of icons in the exemplary embodiment is not limited to the service instruction icons and the function instruction icons described above, and includes icons and the like of other functions, such as machine confirmation and meter confirmation necessary for operating the image forming apparatus 20.

Here, the above-described "third threshold value" is set to a predetermined number of icons displayable in a scrollable screen range on the selection screen 42. Of course, the number of icons is not limited to the numerical value, and can be decided to a requested numerical value as the user requests.

According to the exemplary embodiment, in a case where the number of icons displayed on the selection screen 42 exceeds the third threshold value, it is possible to switch the display format.

According to the exemplary embodiment, in a case where the number of icons displayed on the selection screen 42 is equal to or less than the third threshold value, it is possible to return the display format.

Specifically, for example, in a case where the number of icons exceeds the third threshold value, the first display format in which the function instruction icons with a small number of icons are first displayed is selected.

Sixth Exemplary Embodiment

In the exemplary embodiment, the CPU 31 switches a display format to be executed between the first display format and the second display format depending on a usage frequency of an external cooperation service of the user who uses the image forming apparatus 20 (information processing apparatus).

According to the exemplary embodiment, it is possible to switch a display format to be executed between the first display format and the second display format depending on the usage frequency of the external cooperation service of the user who uses the image forming apparatus 20 (information processing apparatus).

Specifically, in the exemplary embodiment, for example, the CPU 31 executes the first display format, and in a case where there is an external cooperation service the usage frequency of which exceeds a fourth threshold value, displays a guide about whether or not to display a service instruction icon of the external cooperation service on the selection screen 42, to the user.

With this, in a case where there is an external cooperation service the usage frequency of which exceeds the fourth threshold value, the user is allowed to recognize the guide about whether or not to display the corresponding service instruction icon on the selection screen 42.

In the exemplary embodiment, for example, the CPU 31 executes the first display format, and in a case where there is an external cooperation service the usage frequency exceeds the fifth threshold value, freely displays the service instruction icon of the external cooperation service on the selection screen 42 without asking the user for permission, such as a guide.

Here, the fifth threshold value is set in advance to a numerical value greater than the fourth threshold value.

With this, in a case where there is an external cooperation service the usage frequency of which exceeds the fifth threshold value, it is possible to add the corresponding service instruction icon to the selection screen 42.

In the exemplary embodiment, in a case where each user attains authentication and uses the image forming apparatus 20, a usage frequency of an external cooperation service may be stored for each user, and the display format may be switched depending on the above-described usage frequency for each user.

In the first to sixth exemplary embodiments, although the image forming apparatus 20 is employed as an example of an "information processing apparatus", the present disclosure is not limited thereto, and the cloud server 50 may be employed as an example of an "information processing apparatus". In this case, the CPU 51 of the cloud server is an example of a "processor", and an "information processing program" is stored in the ROM 52 or the storage unit 54.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the respective exemplary embodiments described above, although the image forming apparatus 20 is used as an example of an information processing apparatus, the information processing apparatus is not particularly limited to the image forming apparatus, and an apparatus that displays icons on a screen of a mobile phone or the like in cooperation with an external cooperation service is included as the information processing apparatus.

The invention is not limited to the above-described exemplary embodiments, and various modifications, alterations, and improvements can be made without departing from the spirit and scope of the invention. For example, a plurality of exemplary embodiments described above may be combined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, at startup of the information processing apparatus, configured to:
   perform communication with at least a cloud server that provides a plurality of external cooperation services to determine a number of the plurality of external cooperation services;
   enable execution of a plurality of kinds of application software provided from a plurality of external cooperation services;
   enable execution of function display where function instruction icons for instructing which function is executed, among functions executable in cooperation with the application software of the external cooperation services are mostly displayed on a selection screen and service display where a plurality of service instruction icons for instructing which external cooperation service is executed, among the plurality of external cooperation services are mostly displayed on the selection screen;
   automatically switch a display format to be executed between a first display format and a second display format as an initial display format upon the startup of the information processing apparatus according to a number of the plurality of service instruction icons corresponding to the number of the plurality of external cooperation services,
   wherein, in the first display format, the function display is executed and the service instruction icons of the external cooperation services capable of executing a function of the selected function instruction icon in cooperation are displayed, and wherein, in the second display format, the service display is executed and the function instruction icons of functions executable by the external cooperation service of the selected service instruction icon in cooperation are displayed.

2. The information processing apparatus according to claim 1, wherein the processor is configured to:
   execute the first display format in a case where the second display format is executed and the number of external cooperation services in cooperation exceeds a first threshold value.

3. The information processing apparatus according to claim 1, wherein the processor is configured to:
   execute the second display format in a case where the first display format is executed and the number of external cooperation services in cooperation is equal to or less than a first threshold value.

4. The information processing apparatus according to claim 1, wherein the processor is configured to:
   display a guide about whether or not to switch the display format to the first display format in a case where the second display format is executed and the number of external cooperation services in cooperation exceeds a second threshold value.

5. The information processing apparatus according to claim 1, wherein the processor is configured to:
   display a guide about whether or not to switch the display format to the second display format in a case where the first display format is executed and the number of external cooperation services in cooperation is equal to or less than a second threshold value.

6. The information processing apparatus according to claim 1, wherein the processor is configured to:
   receive setting of display and non-display of the function instruction icons and the service instruction icons on the selection screen.

7. The information processing apparatus according to claim 2, wherein the processor is configured to:
   receive setting of display and non-display of the function instruction icons and the service instruction icons on the selection screen.

8. The information processing apparatus according to claim 3, wherein the processor is configured to:
   receive setting of display and non-display of the function instruction icons and the service instruction icons on the selection screen.

9. The information processing apparatus according to claim 4, wherein the processor is configured to:

receive setting of display and non-display of the function instruction icons and the service instruction icons on the selection screen.

10. The information processing apparatus according to claim 5, wherein the processor is configured to:
receive setting of display and non-display of the function instruction icons and the service instruction icons on the selection screen.

11. The information processing apparatus according to claim 1, wherein the processor is configured to:
on the selection screen of the function display, enable to display the service instruction icons and bring the displayed service instruction icons into non-display; and
on the selection screen of the service display, enable to display the function instruction icons and bring the displayed function instruction icons into non-display.

12. The information processing apparatus according to claim 1, wherein the processor is configured to:
switch the display format to the first display format or the second display format in a case where the number of icons displayed on the selection screen exceeds a third threshold value.

13. The information processing apparatus according to claim 1, wherein the processor is configured to:
switch the display format to the first display format or the second display format in a case where the number of icons displayed on the selection screen is equal to or less than a third threshold value.

14. The information processing apparatus according to claim 1, wherein the processor is configured to:
switch the display format to be executed between the first display format and the second display format depending on a usage frequency of the external cooperation service of a user who uses the information processing apparatus.

15. The information processing apparatus according to claim 14, wherein the processor is configured to:
display a guide about whether or not to display the service instruction icon of the external cooperation service on the selection screen in a case where the first display format is executed and there is the external cooperation service a usage frequency of which exceeds a fourth threshold value.

16. The information processing apparatus according to claim 14, wherein the processor is configured to:
display the service instruction icon of the external cooperation service on the selection screen in a case where the first display format is executed and there is the external cooperation service a usage frequency of which exceeds a fifth threshold value.

17. A non-transitory computer readable medium storing an information processing program causing a computer to execute, at startup, a process comprising:
performing communication with at least a cloud server that provides a plurality of external cooperation services to determine a number of the plurality of external cooperation services;
enabling execution of a plurality of kinds of application software provided from a plurality of external cooperation services;
enabling execution of function display where function instruction icons for instructing which function is executed, among functions executable in cooperation with the application software of the external cooperation services are mostly displayed on a selection screen and service display where a plurality of service instruction icons for instructing which external cooperation service is executed, among the plurality of external cooperation services are mostly displayed on the selection screen;
automatically switching a display format to be executed between a first display format and a second display format as an initial display format upon the startup of the computer according to a number of the plurality of service instruction icons corresponding to the number of the plurality of external cooperation services,
wherein, in the first display format, the function display is executed and the service instruction icons of the external cooperation services capable of executing a function of the selected function instruction icon in cooperation are displayed, and wherein, in the second display format, the service display is executed and the function instruction icons of functions executable by the external cooperation service of the selected service instruction icon in cooperation are displayed.

18. An information processing method comprising:
performing communication with at least a cloud server that provides a plurality of external cooperation services to determine a number of the plurality of external cooperation services;
enabling execution of a plurality of kinds of application software provided from a plurality of external cooperation services;
enabling execution of function display where function instruction icons for instructing which function is executed, among functions executable in cooperation with the application software of the external cooperation services are mostly displayed on a selection screen and service display where a plurality of service instruction icons for instructing which external cooperation service is executed, among the plurality of external cooperation services are mostly displayed on the selection screen;
automatically switching a display format to be executed between a first display format and a second display format as an initial display format upon a startup according to a number of the plurality of service instruction icons corresponding to the number of the plurality of external cooperation services,
wherein, in the first display format, the function display is executed and the service instruction icons of the external cooperation services capable of executing a function of the selected function instruction icon in cooperation are displayed, and wherein, in the second display format, the service display is executed and the function instruction icons of functions executable by the external cooperation service of the selected service instruction icon in cooperation are displayed.

* * * * *